(No Model.)

J. W. MORTON.
NUT LOCK.

No. 323,715.  Patented Aug. 4, 1885.

Witnesses  James W. Morton  Inventor

By his Attorney

UNITED STATES PATENT OFFICE.

JAMES W. MORTON, OF ORANGE COURT-HOUSE, VIRGINIA.

NUT-LOCK.

SPECIFICATION forming part of Letters Patent No. 323,715, dated August 4, 1885.

Application filed January 24, 1885. (No model.)

*To all whom it may concern:*

Be it known that I, JAMES W. MORTON, a citizen of the United States, residing at Orange Court-House, Virginia, have invented new and useful Improvements in Nut-Locks, of which the following is a specification.

My invention relates to certain new and useful improvements in devices for locking nuts against turning or becoming displaced by jarring or similar agitation.

The object of my invention is to produce a device by the use of which nuts may be retained securely in position to bind or secure in place the object to which they are applied in such a manner as to render it impossible for them to loosen or work off by shaking or jarring, or by any movement incident to its position.

With these objects in view my invention consists of a thread or its equivalent, with which the thread of the nut engages, so arranged as to support the nut when the latter is in position, the said thread being capable of revolving freely upon the bolt or the like to which it is attached, carrying the nut with it, and also capable of being prevented from turning when desired, in order that the nut may be turned independent thereof, in order to change their relative positions.

In order that it may be clear how my invention may be applied and successfully operated, I will now proceed to describe what I consider the best means of carrying the idea into effect in connection with the accompanying drawings, in which—

Figure 1:
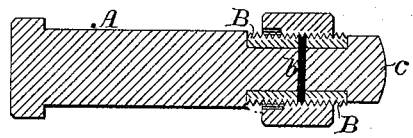
Figure 2:
Figure 3:
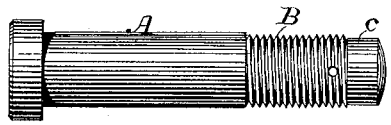

Figure 1 is a central longitudinal vertical section of the device as it appears in its normal position. Fig. 2 is a detail view of the blank used to form the peculiar form of bolt necessary to my invention; and Fig. 3 is a detail of the said bolt in its completed form, showing the movable thread in position.

In the drawings, A represents the main portion of the bolt, and B represents the movable sleeve upon which the nut is placed. The blank from which the nut is made is provided with the reduced neck $b$, and upon this neck is placed the sleeve C, which is provided upon its exterior surface with screw-threads or other suitable means for retaining the nut in position, as shown. The sleeve is of a diameter to allow it to revolve freely upon the bolt, and it is retained in position thereon by a button, $c$, placed upon the end of the bolt, which button may be formed by simply "heading up" the bolt, or may be an independent piece placed upon the bolt and secured by riveting, a screw-thread, or the like. To get the best results in the operation of the device, I supply the space between the interior of the sleeve and the reduced neck of the bolt with a lubricant, to insure its ready turning when force is exerted tending to produce that result.

In order that the sleeve may be held stationary when it is desired to turn the bolt independent thereof, I provide the neck of the bolt with one or more holes passing therethrough from points diametrically opposite in the circumference thereof, and I also provide the sleeve with correspondingly-arranged holes, so that the holes, respectively, in the neck and sleeve may be brought to register with each other, and a pin inserted to render the sleeve stationary. The pin used should be of a length to extend through the bolt and a short distance into the shell carrying the thread, but not long enough to project and impede the progress of the nut when being screwed on.

A convenient means limiting the inward movement of the nut is provided by making that part of the bolt adjacent to the sleeve of a diameter slightly greater than that of the sleeve, so that as soon as the thread upon the interior of the nut comes in contact with the bolt its movement in that direction is checked.

It frequently happens that by reason of the wear of the parts or other cause it is desirable to screw the nut to bring it farther inward toward the object to which it is applied. Therefore I form the rear part of the nut with an opening adapting it to receive the contiguous portion of the bolt, so the nut is capable of being carried inwardly a distance equal to the length of this opening.

From the foregoing it will be apparent that when the nut is screwed into its proper position upon the sleeve, and the pin which holds the said sleeve in position to receive it is removed, any jarring, &c., of the bolt will turn the sleeve, carrying the nut with it, and the latter will not receive any motion independent of the sleeve. Consequently the position of the nut in relation to the body to which it is applied is not changed.

Although I have particularly described the precise construction of the respective parts employed in the device, I do not of course wish to be understood as limiting myself thereby, as many modifications may be made without departing from the spirit of my invention.

Having thus described my invention, what I claim as new, and desire to secure by Letters Patent, is—

1. As a means for retaining a nut against moving longitudinally upon the bolt to which it is attached, a freely-revolving sleeve mounted upon the bolt and carrying the nut, as described.

2. As a means for retaining a nut against moving longitudinally upon the bolt to which it is attached, a freely-revolving sleeve mounted upon the bolt, retained thereon by an enlargement upon the end of the said bolt, the nut being carried by the sleeve, substantially as described.

3. As a means for retaining a nut against moving longitudinally independent of the bolt to which it is attached, a bolt provided with a freely-revolving screw-threaded sleeve by which the nut is carried, the said bolt and sleeve being provided with registering holes for the reception of a pin to hold the sleeve while the nut is screwed thereon.

In testimony whereof I have hereunto set my hand and seal in the presence of two subscribing witnesses.

JAMES W. MORTON. [L. S.]

Witnesses:
E. W. ROW,
W. W. HUME.